US006345703B1

United States Patent
Peng

(10) Patent No.: US 6,345,703 B1
(45) Date of Patent: Feb. 12, 2002

(54) MAGNETIC ADJUSTABLE LOADING WHEEL FOR AN EXERCISE APPARATUS

(76) Inventor: Juei-Tang Peng, No. 312, Yen Ping Rd., Sec. 3, Hsinchu City (TW)

( * ) Notice: Subject to any disclaimer, the term of this patent is extended or adjusted under 35 U.S.C. 154(b) by 0 days.

(21) Appl. No.: 09/624,990

(22) Filed: Jul. 25, 2000

(51) Int. Cl.⁷ ................................................. F16F 15/03
(52) U.S. Cl. ........................................ 188/164; 188/325
(58) Field of Search .......................... 188/88, 325, 164, 188/158, 159

(56) References Cited

U.S. PATENT DOCUMENTS 5,711,404 A * 1/1998 Lee .............................. 188/164
6,253,890 B1 * 7/2001 Hunter ........................ 188/325

* cited by examiner

*Primary Examiner*—Matthew C. Graham

(74) *Attorney, Agent, or Firm*—Rosenberg, Klein & Lee

(57) ABSTRACT

The present invention relates to a magnetic adjustable loading wheel for an exercise apparatus, comprising a flywheel having a metal conductor fixed at the inner rim thereof; a stator disk disposed at the inner side rim of the flywheel; and a pair of resilient pieces mounted on the stator disk, a permanent magnet being fitted on the resilient piece. It's characterized in that the stator disk having two radial through holes is disposed at the inner rim of an outer plate while two reception holes used for receiving a spring are respectively provided near two sides of each of the through holes, and a turning plate is mounted on a shaft receptor, and a pull rope extending to the outside is used for controlling the rotation of the turning plate, and that resilient pieces includes a guide post and two pushing posts corresponding to the through hole and the reception holes of the stator disk so that the guide post is able to penetrates through the through hole and then a connecting rod is pivotally disposed at the front end thereof while the other end of the connecting rod is pivotally disposed in a pivoting hole of the turning plate, and the pushing posts pushes against the springs to be located inside of the reception holes.

2 Claims, 7 Drawing Sheets

MAGNETIC ADJUSTABLE LOADING WHEEL FOR AN EXERCISE APPARATUS

BACKGROUND OF THE INVENTION

1. Field of the Invention

The present invention relates to a magnetic adjustable loading wheel for an exercise apparatus, and more particularly to a device that can reach a stable adjustment of the magnetic loading.

2. Description of the Prior Art

A conventional magnetic adjustable loading wheel, as shown in FIG. 1, is provided with a resilient piece 1 of a permanent magnet 11. One end of the resilient piece 1 is pivotally disposed at a proper position (A) of a stator disk 2', while the other end thereof is formed to be a free end. A guide rope is connected thereto respectively, and it is used for adjusting the permanent magnet 11 on the resilient piece 1. The clearance between the permanent magnet 11 and a metal conductor 31 at the inner rim of a flywheel 3 is therefore adjustable to change the amount of the magnetic flux. Accordingly, the magnetic loading is adjustable. A similar disclosure in this prior art is seen, for example, from the U.S. Pat. Nos. 5,711,404, 1,881,164. However, the obtained clearance of this prior art between the permanent magnet 11 and the metal conductor 31 can't reach an isodistant effect (D1≠D2≠D3) so that the magnetic flux is unstable.

SUMMARY OF THE INVENTION

It is a primary object of the present invention to remove the above-mentioned disadvantages of the prior art and to provide a magnetic adjustable loading wheel for an exercise apparatus in which the clearance between a permanent magnet and a metal conductor obtained by means of radial displacement of the resilient piece will enable the magnetic loading to be adjusted stably.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
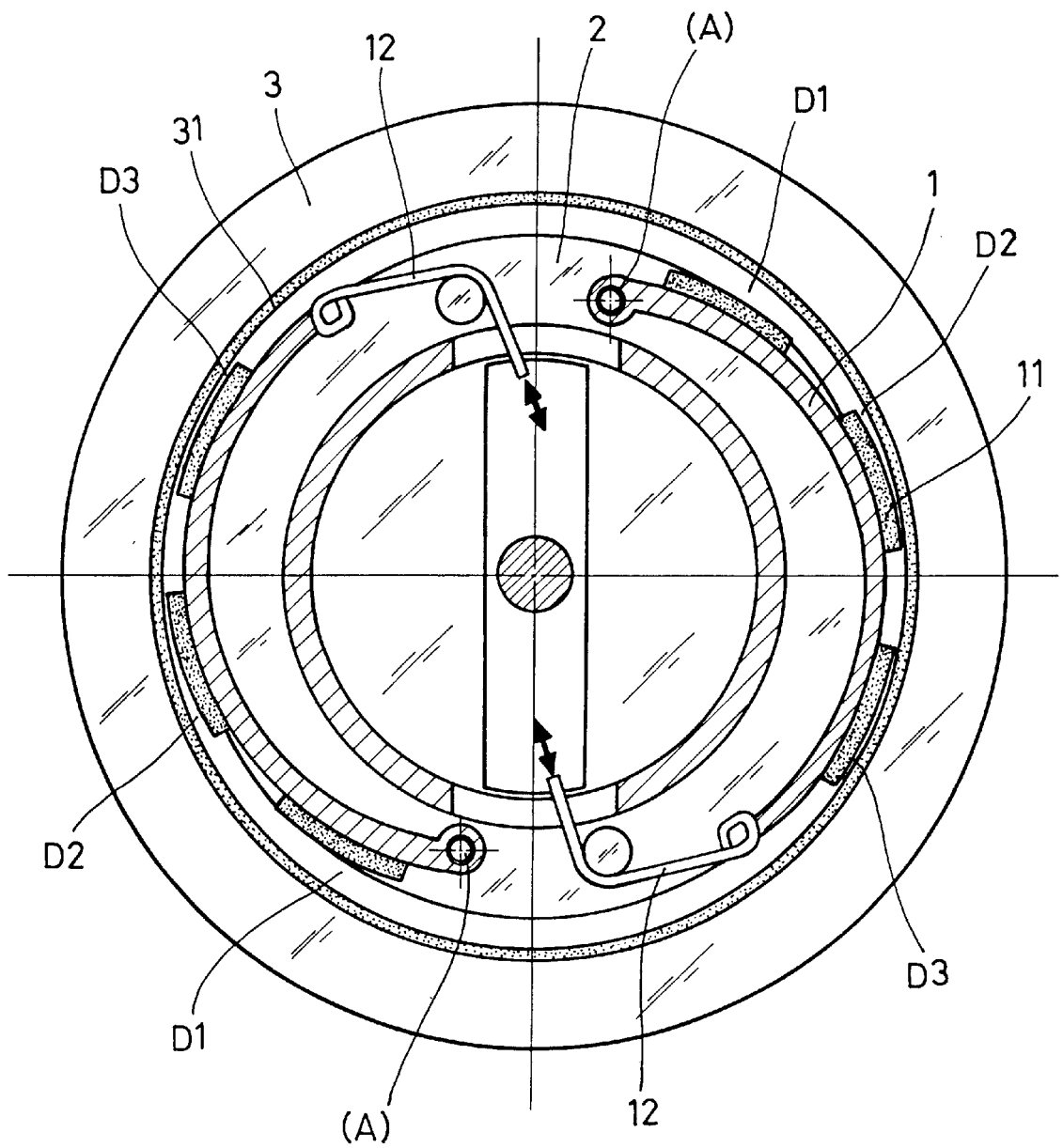
FIG. 1 is a schematic drawing of a conventional magnetic adjustable loading wheel.
Figure 2:
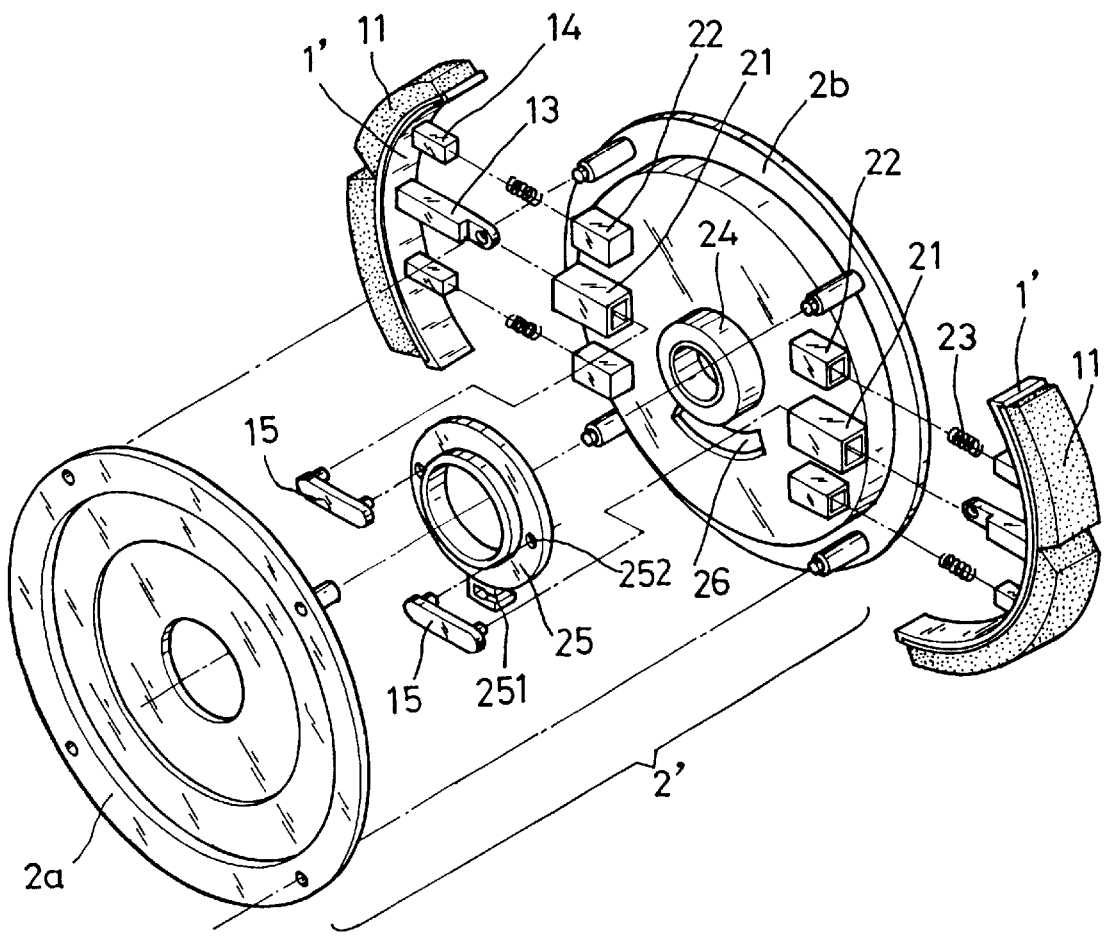
FIG. 2 is a perspective exploded view of a stator disk of the present invention.
Figure 3:
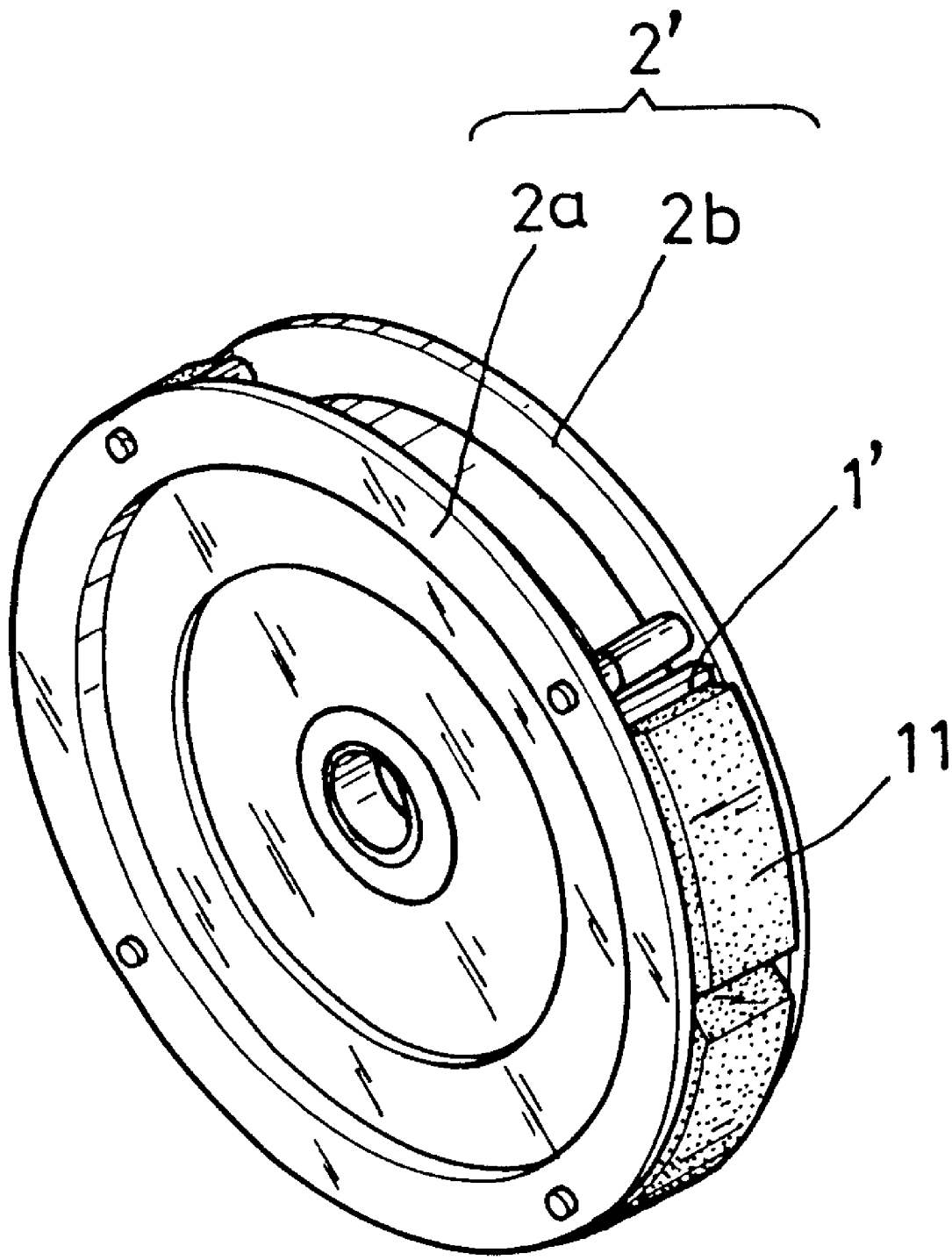
FIG. 3 is a perspective view of the assembled stator disk of the present invention.

First of all, referring to FIGS. 2 through 6, the magnetic adjustable loading wheel for an exercise apparatus in accordance with the present invention is mounted on a turning shaft 4 includes: a flywheel 3 having a metal conductor 31 fixed at the inner rim thereof; a stator disk 2' disposed at the inner side rim of the flywheel 3; and a pair of resilient pieces 1' mounted on the stator disk 2', a permanent magnet 11 being fitted on the resilient piece 1'; wherein the improvement is characterized by:

the stator disk 2' consisting of an inner plate 2a and an outer plate 2b, two radial through holes 21 being disposed at the inner rim of the outer plate 2b, two reception holes 22 used for receiving a spring 23 being respectively provided near two sides of each of the through holes 21, a turning plate 25 with a locking piece 251 being mounted on a shaft receptor 24, an arched groove 26 being provided under the shaft receptor 24 in order for the locking piece 251 to displace itself and to limit the position thereof, a pull rope (Y) being connected to the arched groove 26 for controlling the rotation of the turning plate 25;

the resilient pieces 1' having a guide post 13 and two pushing posts 14 corresponding to the through hole 21 and the reception holes 22 of the stator disk 2' so that the guide post 13 is able to penetrates through the through hole 21 and then a connecting rod 15 is pivotally disposed at the front end thereof while the other end of the connecting rod 15 is pivotally disposed in a pivoting hole 252 of the turning plate 25, the pushing posts 14 pushing against the springs 23 to be located inside of the reception holes 22.

Figure 4:
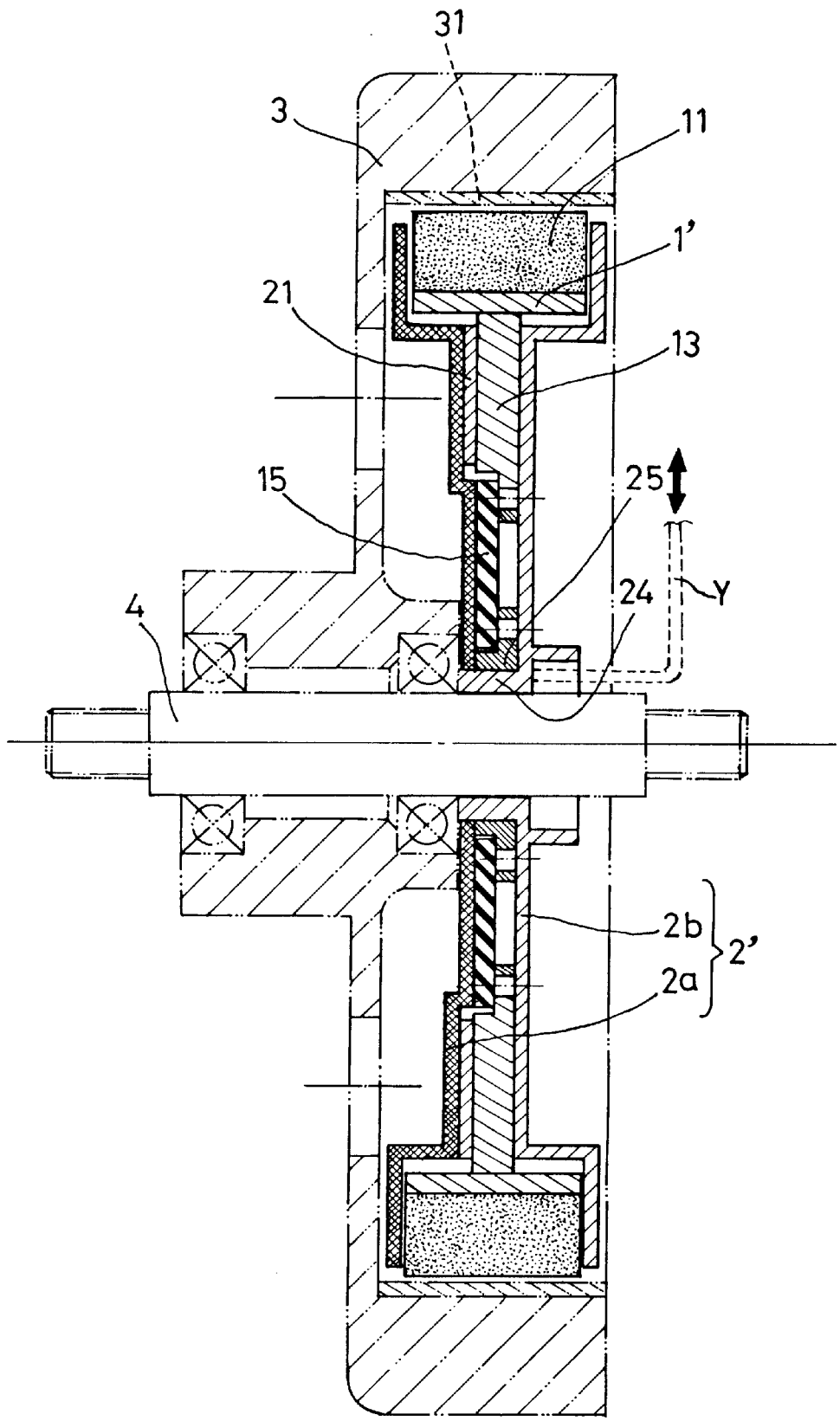
FIG. 4 is a longitudinal section of the present invention.
Figure 5:
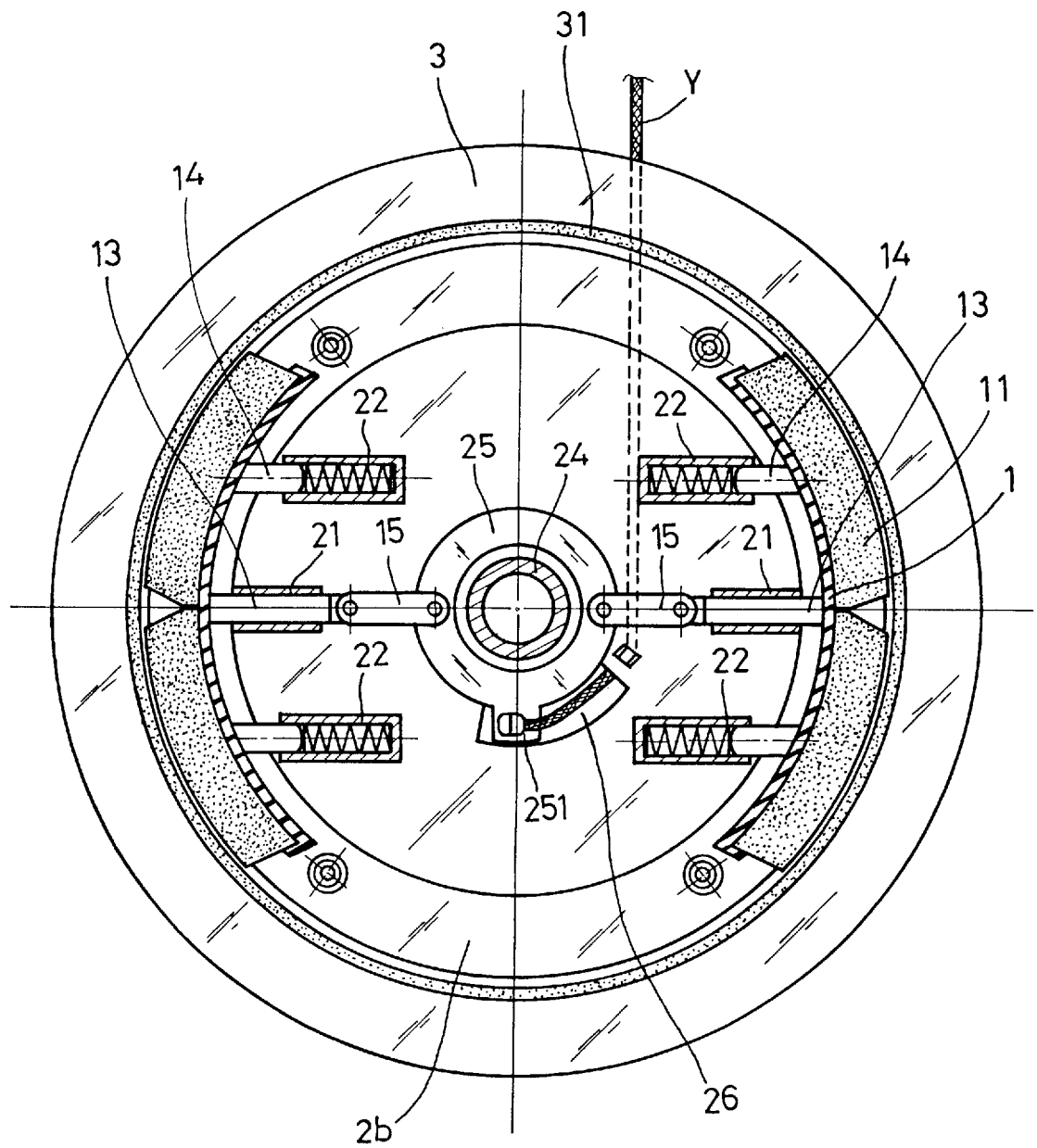
FIG. 5 is a first cross section of the present invention.
Figure 6:
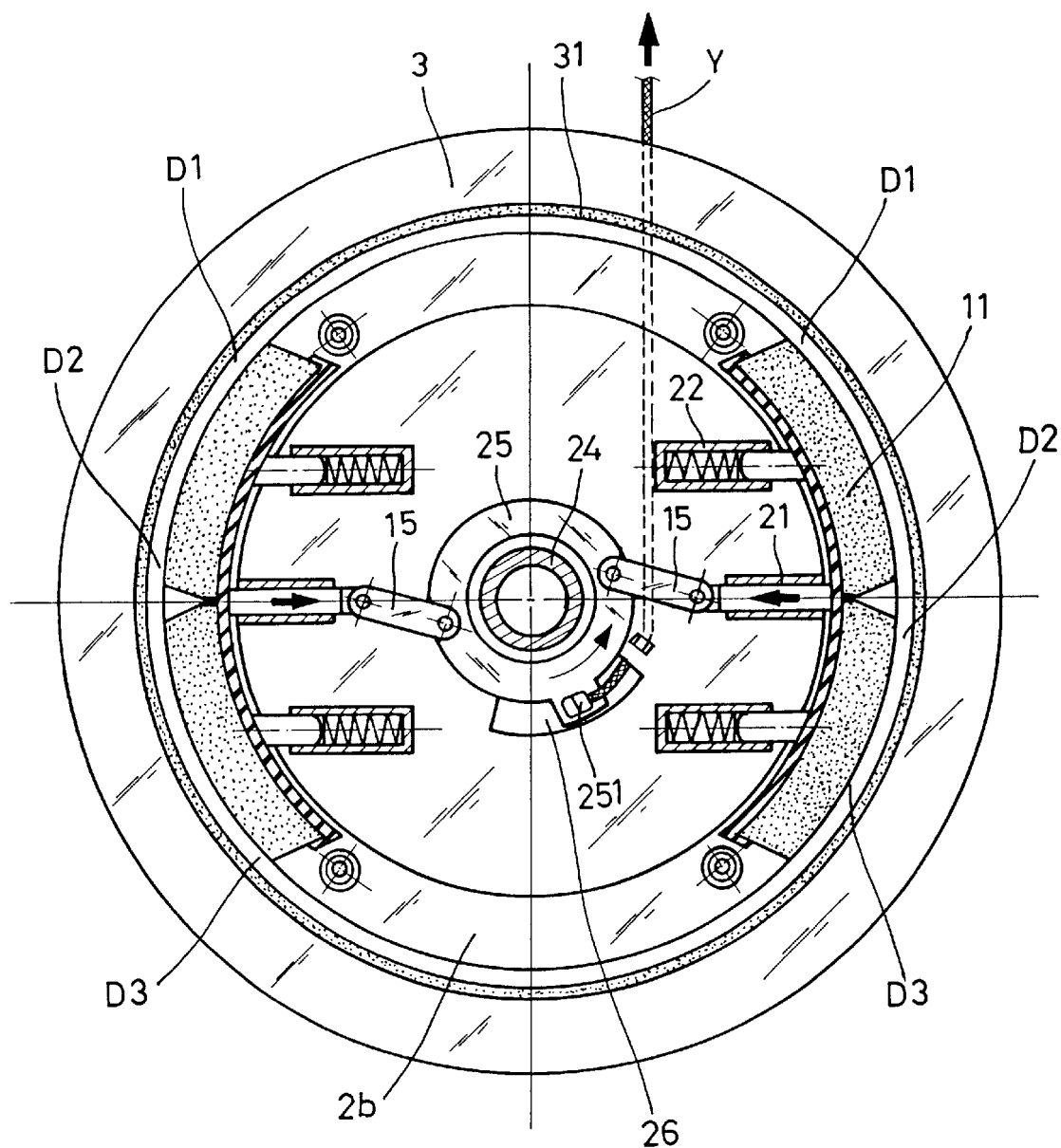
FIG. 6 is a second cross section of the present invention.

In accordance with the above-mentioned configuration, the present invention, as shown in FIGS. 4 and 5, controls the rotation angle of the turning plate 25 by means of the pull rope (Y) so that the guide post 13 will be pulled inward by the connecting rod 15. Since the through holes 21 are radially disposed so that the resilient piece 1' contracts itself inwards by means of the radial pull force of the guide post 13. (When the pull rope (Y) is loosened, the resilient piece 1' will be pushed outwards by means of the resilience of the spring 23.). Accordingly, the clearance between the permanent magnet 11 of the resilient piece 1' and the metal conductor 31 of the flywheel 3 is forever kept unchanged, as shown in FIG. 6 (D1=D2=D3), in order to achieve a stable adjustment effect of the magnetic loading.

Figure 7:
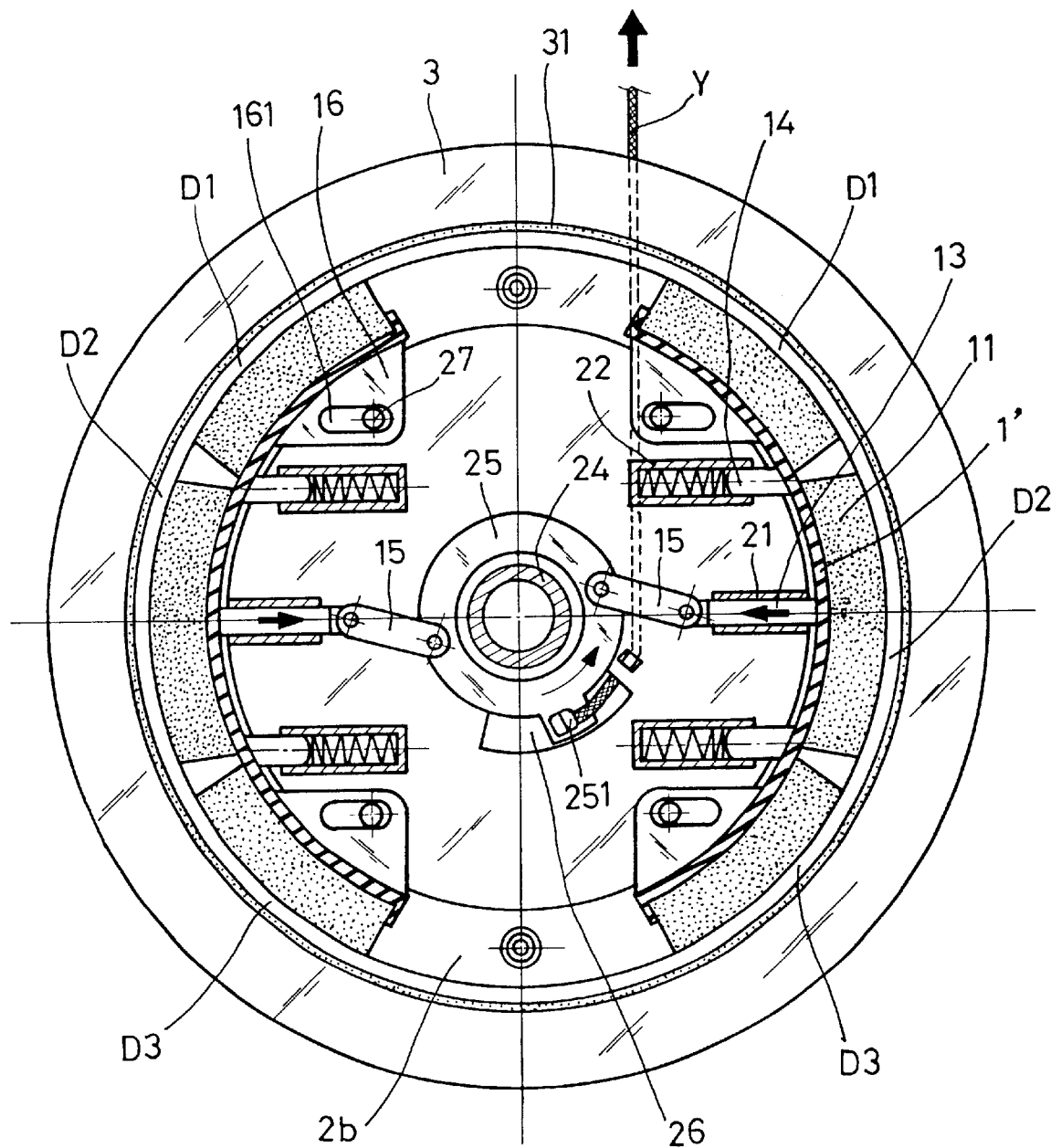
FIG. 7 is a cross section of another embodiment of the present invention.

Furthermore, referring to FIG. 7, two sides of the right and left resilient pieces 1' are extended for installing three permanent magnets 11 so that the coupling area of the permanent magnet 11 with the metal conductor 31 is increased to raise the magnetic loading. In order to stabilize the movement of the resilient pieces 1' after two sides thereof are extended, an extension piece 16 is provided at the inner rim thereof, having an oblong guide slot 161 in which a cylindrical projection 27 on the stator disk 2' slides.

The clearance of the resilient piece 1' of the present invention is adjusted by means of displacement instead of which one end of the prior art is pivotally disposed while the other end is adjusted by pulling. Accordingly, an expected isodistant magnetic flux can be adjusted and stabilized.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A magnetic adjustable loading wheel for an exercise apparatus, comprising:

a flywheel having a metal conductor fixed at the inner rim thereof;

a stator disk disposed at the inner side rim of said flywheel; and a pair of resilient pieces mounted on said stator disk, a permanent magnet being fitted on said resilient piece, wherein the improvement is characterized by:

said stator disk having two radial through holes being disposed at the inner rim of an outer plate, two pairs of reception holes used for receiving springs being respectively provided near two sides of each of said through holes, a turning plate being mounted on a shaft receptor, a pull rope extending to the outside being used for controlling the rotation of said turning plate;

each of said resilient pieces having a guide post and two pushing posts corresponding to the adjacent through hole and said pair of reception holes of said stator disk so that said guide post is able to penetrate through said through hole and a connecting rod is pivotally disposed at the front end of each said guide post while the other end of said connecting rod is pivotally disposed in a pivoting hole of said turning plate, said pushing posts pushing against said springs to be located inside of said reception holes.

2. A magnetic adjustable loading wheel for an exercise apparatus as claimed in claim 1, wherein said turning plate includes a locking piece at the outer rim thereof, and an arched groove is provided under said shaft receptor in order for said locking piece to displace itself and to limit the position thereof.

\* \* \* \* \*